Figure 1:
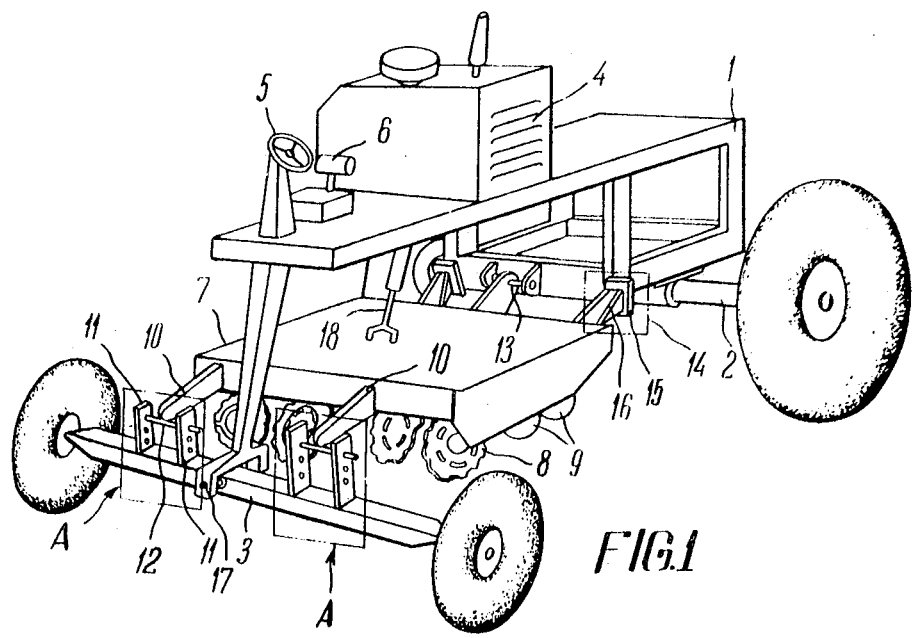

United States Patent

Tatianko et al.

[15] 3,664,431
[45] May 23, 1972

[54] AGRICULTURAL SELF-PROPELLED HARVESTING MACHINE

[72] Inventors: Nikolai Vasilievich Tatianko prospekt Gagarina, 175, kv. 43; Alexandr Gavrilovich Tsymbal ulitsa Naberezhnaya, 9, kv. 4; Vladimir Vasilievich Stetsenko ulitsa Kharkovskikh divizy, 5, kv. 118; Sergei Alexandrovich Isikov ulitsa Matrosova, 8, kv. 49; Fedor Leontievich Rodenko poselok Zhikhor, ulitsa Tsiolkovskogo, 4; Alexandr Samuilovich Betcher ulitsa Bairona, 175, kv. 133; Petr Dmitrievich Shamrai prospekt Gagarina, 163/4, kv. 30; Mikhail Afanasievich Dulya prospekt Gagarina, 163/4, kv. 32; Viktor Vasilievich Dudka prospekt Gagarina, 163/4; Ivan Petrovich Klimchuk ulitsa Pyatigorskaya, 8, kv. 76; Anatoly Mikhailovich Dolgov, prospekt Gagarina, 169, kv. 89, all of Kharkov, U.S.S.R.

[22] Filed: July 15, 1970

[21] Appl. No.: 55,160

[52] U.S. Cl. .................................................171/58, 56/14.7
[51] Int. Cl. .........................................................A01d 25/04
[58] Field of Search....................56/6, 10.2, 10.4, 11.9, 12.7, 56/13.6, 14.9, 15.3, 15.6, 15.7, 15.9, 17.1, 14.7; 171/58; 172/483

[56] References Cited

UNITED STATES PATENTS

| 2,972,850 | 2/1961 | Ariens et al. | 56/15.6 |
| 3,483,684 | 12/1969 | Price | 56/15.3 |

*Primary Examiner*—Antonio F. Guida
*Attorney*—Waters, Roditi, Schwartz & Nissen

[57] ABSTRACT

In an agricultural self-propelled harvesting machine a hinge-joint connection of the fixed frame with the movable frame which carries the working members, said hinge-joint connection enabling the movable frame to turn both round the longitudinal and the transverse axes of the machine. The front axle of the machine carries stop blocks upon which the cantilevers of the movable frame are free to rest, said stop blocks enabling the movable frame to move both horizontally and vertically depending upon the variation of the front axle position.

2 Claims, 2 Drawing Figures

PATENTED MAY 23 1972 3,664,431

AGRICULTURAL SELF-PROPELLED HARVESTING MACHINE

The present invention relates to improvements in farm machinery and equipment, more specifically to an improvement in an agricultural self-propelled harvesting machine intended for gathering root or tuber crops.

Widely known in the art are wheeled self-propelled harvesters featuring a fixed frame and a movable frame hinged thereto and carrying working members, whereas connected to said fixed frame are front and rear wheel axles, the front one being hinged-joined. The fixed frame mounts the engine and machine control mechanisms.

The working members are brought in contact with the soil and out of contact therewith by virtue of a hydromechanical lift which actuates the movable frame.

To fix the working members during harvesting in their bottom-most position (i.e., their penetration depth), provision is made for special limiting elements (brackets or rods) mounted on the fixed frame and adapted to hold the movable frame in a required position.

With such a design of the machine any accidental oscillations of the fixed frame caused, say, by the ground roughness are inevitably relayed to the working members through the limiting elements, thus adversely affecting the accuracy of penetration of the working members into the rows of the crop being harvested both in plan and for depth.

In order to reduce the adverse affect of the above disadvantage attempts were made to provide the machines of the afore-described design with a special corrector device to compensate for inaccuracies in the run of the working members along the rows of the crops being harvested. However, introducing of such devices and contrivances brings about some constructional difficulties due to an increased longitudinal base of the machine which impairs the stability thereof. A point not to be overlooked is that such devices prove to be almost ineffective, since provision of these necessitates the digging members to be mounted more distantly from the front wheels, this partly increasing the inaccuracy in a correct bringing of the digging members on the rows of the crops being harvested.

Said disadvantages especially impair the quality of harvesting when employing wide-cut machines (with an effective width in excess of 2 m), since the effect of the field roughness and curvature of the plant rows rises in ratio with the effective width of the machine.

It is an object of the present invention to provide a more accurate penetration of the digging members into the rows of the crops being harvested at a preset depth of penetration and any slope of the field at the digging place.

These and other objects have been accomplished by providing in a self-propelled harvester, a fixed carrier frame, whereon the front axle is hinged, and a movable frame carrying working members and hinge-joined with the fixed frame nearby the rear axle. Furthermore according to the invention said hinge-jointing of the movable frame makes it pivotable round the longitudinal and transverse axes of the machine. Additionally, the movable frame is provided with at least one cantilever or angle bracket loosely resting upon a stop block located on the front axle and having sections serving as guideways for said cantilever to vertically or horizontally travel in response to any variation of the front axle position.

Use can be made of a cantilever mounted on the movable frame as such device, whereas the stop block can be made as a vertical stand located on the front axle and provided with holes made at different heights for setting the rods therein which are to limit the degree of lowering of the movable frame and, consequently, the depth of penetration of the working members.

The application of the present invention ensures that the steerable front axle is kinematically associated with the movable frame carrying the working members which makes it possible to employ the front wheels as finders to control the position of said working members. Besides, the working members can be mounted as close to the front wheels as possible and, consequently, a high degree of accuracy of tracing of the microrelief both in longitudinal and transverse directions. Moreover, oscillations of the carrier frame do not practically affect the position of the movable frame, thus excluding the possibility of breakage of the working members, since when encountering any unclearable obstacle the movable frame, due to its being loosely mounted in working position, is raised and the working member is free to pass over said obstacle.

Finally, the employment of the present invention makes it possible to enhance the maneuverability of the agricultural machine owing to a reduction of the distance between the front and rear axles and, consequently, the reduction of its turning radius.

Figure 2:
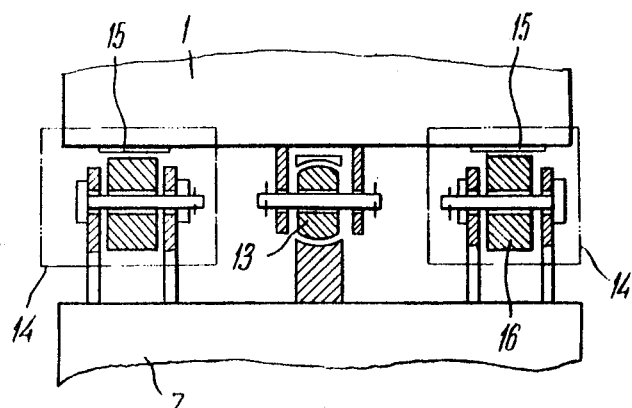

An embodiment of the present invention is described hereinbelow in detail by way of example with due reference to the accompanying drawings, wherein:

FIG. 1 represents a schematic diagram of a self-propelled harvesting machine, according to the invention; and FIG. 2 shows a diagram of the hinge-jointing of a movable frame.

Now referring to FIG. 1 in the self-propelled harvester of the invention a fixed frame 1 is connected with a rear axle 2 of the driving wheels and a front axle 3 of the steerable wheels. The fixed frame 1 mounts also an engine 4 with the transmission gear-box (not present in the drawing), machine controls 5 and a driver's seat 6. Hinge-joined with the fixed frame 1 is a movable frame 7 which carries the working members of the machine, viz., diggers 8 and root cleaners 9, the former being mounted as close to the front axle as possible.

The movable frame 7 has two cantilevered arms 10 arranged symmetrically with respect to the movable frame center line.

The front axle carries stop blocks A, whereon the arms 10 are free to rest when in working position. Each of the stop blocks A comprises essentially two uprights 11 provided with holes made at different heights therein and rods 12 fitted into said holes. Both the uprights and the rods serve as guideways for the arms 10 to travel, the rods 12 restricting the vertical travel of the arms, thus controlling the penetration depth of the diggers, and the uprights 11 serving as the guideways for the arms to horizontally travel in response to the turn of the front axle 3.

The hinge-jointing of the movable frame 7 is made on the base of a ball-and-socket joint 13. To avoid turning of the movable frame 7 in a horizontal plane, restrictors 14 (FIG. 2) are provided which are arranged symmetrically with respect to the axis of the ball-and-socket joint 13 and are made as plates 15 held to the frame 1 and rollers 16 capable of riding over said plates and fixed to the movable frame 7.

The front steerable axle 3 is connected to the fixed frame 1 by means of a hinge-joint 17 having a longitudinal pivot. FIG. 1 represents the machine while in harvesting position, with the cantilevered arms 10 resting upon the stop blocks A and the working members contacting the surface of the rows of the crop being harvested. When in travel position the working members are brought out of contact with the crop rows by virtue of a hydraulic lifting jack 18 whose cylinder is articulated to the fixed frame 1, while its rod is coupled to the movable frame 7.

The herein-disclosed machine operates as follows. The front axle the rods 12 are so fitted into the holes of the uprights 11 that when the cantilevered arms 10 drop thereonto the diggers fixed in the movable frame 7 are free to penetrate into the soil for a preset depth. Then by using the hydraulic lifting jack the movable frame 7 is urged to move downwards until the arms 10 are free to rest upon the rods 12. While on the move the driver steers the wheels of the front axle 3 along the rows of the crop being harvested. When the front wheels move up the row slope the axle 3 gets tilted with respect to the joint 13 in the plane of the slope, the stop blocks A along whose guideways travel the arms 10, change their position, thus bringing about the corresponding change in the position of the movable frame 7 which in turn ensures the required setting of the working members. When the front axle 3 is turned to follow the curvature of the crop rows the arm 10 turns after the turn of the front axle 3, thereby providing a corresponding turn of the frame 7 in a horizontal plane.

Thus, the movable frame exactly follows both the transverse and the longitudinal profile of the rows being treated, the preset depth of penetration of the diggers remaining unaffected.

What is claimed is:

1. An agricultural self-propelled harvesting machine, comprising: a fixed carrier frame; front and rear axles associated with said fixed frame, the front axle being hinge-joined with said frame and determining the direction of run of the machine; a movable frame hinge-joined with said fixed frame on the side of the rear axle, said hinge-jointing enabling said movable frame to pivot both round the longitudinal and the transverse axes of the machine; said movable frame being provided with at least one cantilever for said movable frame and said front axle to bring in cooperation in the course of harvesting; at least one stop block located on the front axle; said stop block being adapted for said cantilever to freely rest thereupon during the machine operation; said stop block having sections serving as guideways for said cantilever to horizontally and vertically travel in response to any variation of the front axle position as a result of which said working members are free to follow the relief of the soil being treated in the longitudinal and transverse planes.

2. A machine as claimed in claim 1, wherein the movable frame has two cantilevers arranged on both sides with respect to the longitudinal axis of the movable frame and freely resting upon the stop blocks each of which comprises essentially two uprights provided with holes made at different heights for fitting the rods keeping said cantilevers in working position at the required height.

* * * * *